United States Patent
Tang et al.

(10) Patent No.: US 11,690,206 B2
(45) Date of Patent: Jun. 27, 2023

(54) METHOD FOR ELECTROMAGNETIC INTERFERENCE CONTROL, ELECTRONIC DEVICE, AND STORAGE MEDIUM

(71) Applicant: GUANGDONG OPPO MOBILE TELECOMMUNICATIONS CORP., LTD., Guangdong (CN)

(72) Inventors: Kai Tang, Guangdong (CN); Zhengpeng Tan, Guangdong (CN); Yun Chen, Guangdong (CN); Lizhong Wang, Guangdong (CN); Hai Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 295 days.

(21) Appl. No.: 17/237,448

(22) Filed: Apr. 22, 2021

(65) Prior Publication Data

US 2021/0243885 A1  Aug. 5, 2021

Related U.S. Application Data

(63) Continuation of application No. PCT/CN2019/109456, filed on Sep. 30, 2019.

(30) Foreign Application Priority Data

Oct. 23, 2018  (CN) .......................... 201811236848.9

(51) Int. Cl.
*H05K 9/00* (2006.01)
*G06V 40/13* (2022.01)
(Continued)

(52) U.S. Cl.
CPC ......... *H05K 9/0054* (2013.01); *G06F 3/0412* (2013.01); *G06V 40/13* (2022.01); *H05K 1/0216* (2013.01); *H05K 2201/10128* (2013.01)

(58) Field of Classification Search
CPC .............. H05K 9/0054; H05K 1/0216; H05K 2201/10128; G06F 3/0412; G06F 3/04184;
(Continued)

(56) References Cited

U.S. PATENT DOCUMENTS

2005/0150697 A1* 7/2005 Altman ................ G06F 3/0346
178/19.02
2009/0296797 A1* 12/2009 Wei ........................ H04L 1/244
375/228

(Continued)

FOREIGN PATENT DOCUMENTS

CN    103677449    3/2014
CN    205545720    8/2016
(Continued)

OTHER PUBLICATIONS

CNIPA, First Office Action issued in corresponding CN application No. 201811236848.9 dated Jul. 29, 2021.
WIPO, International Search Report for PCT/CN2019/109456, dated Dec. 27, 2019.
EPO, Extended European Search Report for EP Application No. 19875351.9, dated Dec. 2, 2021.

*Primary Examiner* — Jonathan A Boyd
(74) *Attorney, Agent, or Firm* — Hodgson Russ LLP (57) ABSTRACT

A method for electromagnetic interference control, an electronic device, and a storage medium are provided. The method is for an electronic device. The electronic device includes a display screen and an under-screen fingerprint assembly arranged under a preset region of the display screen. The method includes the following. Detect electromagnetic interference between the under-screen fingerprint
(Continued)

assembly and the display screen in response to detecting that the under-screen fingerprint assembly is activated, where the preset region of the display screen is in a lighted state. Frequency-hopping is performed for a mobile industry processor interface (MIPI) of the display screen in response to the detected electromagnetic interference.

20 Claims, 4 Drawing Sheets

(51) Int. Cl.
*G06F 3/041* (2006.01)
*H05K 1/02* (2006.01)

(58) Field of Classification Search
CPC ......... G06F 3/147; G06F 21/32; G06V 40/13; G06V 40/1312; G09G 5/006; G09G 2340/0435; H04M 1/72454; H04M 1/026; H04M 1/0266; H04M 2250/12
See application file for complete search history.

(56) References Cited

U.S. PATENT DOCUMENTS

| | | | |
|---|---|---|---|
| 2017/0171367 A1 | 6/2017 | Liu et al. | |
| 2018/0365472 A1 | 12/2018 | Cai | |
| 2019/0205603 A1* | 7/2019 | Lee | G06V 40/1329 |
| 2019/0340413 A1 | 11/2019 | Zhang | |

FOREIGN PATENT DOCUMENTS

| | | |
|---|---|---|
| CN | 106028769 | 10/2016 |
| CN | 106547550 | 3/2017 |
| CN | 106845422 | 6/2017 |
| CN | 106936515 | 7/2017 |
| CN | 107562289 | 1/2018 |
| CN | 108063646 | 5/2018 |
| CN | 108111679 | 6/2018 |
| CN | 108323207 | 7/2018 |
| CN | 108601037 | 9/2018 |
| WO | 2017048066 | 3/2017 |

* cited by examiner

METHOD FOR ELECTROMAGNETIC INTERFERENCE CONTROL, ELECTRONIC DEVICE, AND STORAGE MEDIUM

CROSS-REFERENCE TO RELATED APPLICATION(S)

This application is a continuation of International Application No. PCT/CN2019/109456, filed on Sep. 30, 2019, which claims priority to Chinese Patent Application No. 201811236848.9, filed on Oct. 23, 2018, the entire disclosures of which are hereby incorporated by reference.

TECHNICAL FIELD

This disclosure relates to the technical filed of electronic devices, and particularly to a method for electromagnetic interference control, an electronic device, and a storage medium.

BACKGROUND

With the development of mobile communication technology, functions of electronic devices such as mobile phones are becoming increasingly diversified. At present, most mobile phones are integrated with an under-screen fingerprint assembly, to realize an under-screen fingerprint unlocking function. However, electromagnetic interference may occur between a mobile industry processor interface (MIPI) frequency of a display screen and an operating frequency of the under-screen fingerprint assembly, which may cause an error in fingerprint recognition and unlock failure.

SUMMARY

According to a first aspect, implementations provide a method for electromagnetic interference control. The method is for an electronic device. The electronic device includes a display screen and an under-screen fingerprint assembly arranged under a preset region of the display screen. The method includes the following.

Detect electromagnetic interference between the under-screen fingerprint assembly and the display screen in response to detecting that the under-screen fingerprint assembly is activated, where the preset region of the display screen is in a lighted state. Frequency-hopping is performed for a mobile industry processor interface (MIPI) of the display screen in response to the detected electromagnetic interference.

According to a second aspect, implementations provide an electronic device. The electronic device includes at least one processor and a memory. The memory is coupled to the at least one processor and stores at least one computer executable instruction thereon which, when executed by the at least one processor, causes the at least one processor to execute the method of the first aspect.

According to a third aspect, implementations provide a non-transitory computer readable storage medium. The non-transitory computer readable storage medium is configured to store a computer program which, when executed by a processor, causes the processor to execute the method of the first aspect.

BRIEF DESCRIPTION OF THE DRAWINGS

To describe technical solutions in implementations of the present disclosure more clearly, the following briefly introduces accompanying drawings required for illustrating the implementations. Apparently, the accompanying drawings in the following description illustrate some implementations of the present disclosure. Those of ordinary skill in the art may also obtain other drawings based on these accompanying drawings without creative efforts.

DETAILED DESCRIPTION

Technical solutions in implementations of the present disclosure will be described clearly and completely hereinafter with reference to the accompanying drawings described. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms "first", "second", and the like used in the specification, the claims, and the accompany drawings of the present disclosure are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

The term "implementation" referred to herein means that a particular feature, structure, or feature described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

The electronic device involved in the implementations of the present disclosure may include various handheld devices, in-vehicle devices, wearable devices, computing devices that have wireless communication functions or other processing devices connected to the wireless modem, as well as various forms of user equipment (UE), mobile stations (MS), terminal devices, and the like. For the convenience of description, the above-mentioned devices are collectively referred to as an electronic device. Hereinafter, the implementations of the disclosure will be interpreted with reference to the accompanying drawings.

Figure 1:
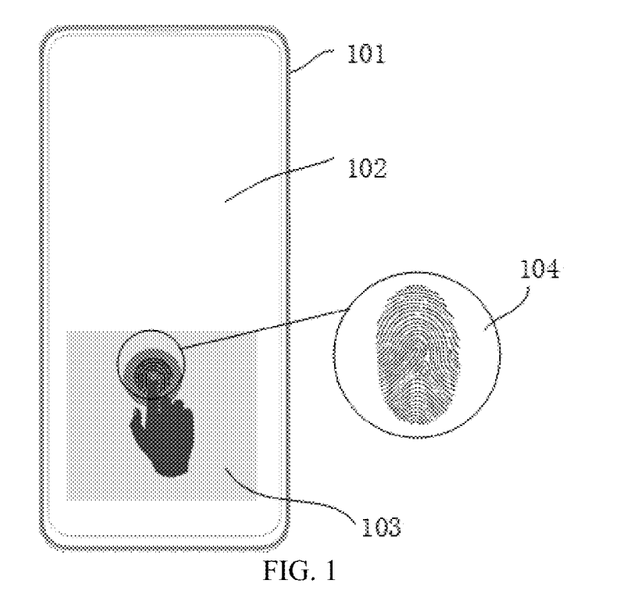
FIG. 1 is a schematic structural diagram illustrating an electronic device according to implementations.

The fingerprint recognition technology associates a person with his/her fingerprint. By comparing his/her fingerprint with a pre-saved fingerprint, that is, comparing minutiae feature points of different fingerprints, for authentication, his/her true identity can be verified. Fingerprint lines generally have breakpoints, bifurcation points, or turning points. These breakpoints, bifurcation points, and turning points are called "feature points". The fingerprint line of each person is unique in patterns, breakpoints, and intersections. Only by relying on this uniqueness and stability can we develop the fingerprint recognition technology. The skin line of each person, including fingerprint, are different in patterns, breakpoints, and intersections, which are unique and remain the same throughout their lives. The fingerprint recognition technology has advantages of fast recognition speed, convenient collection, and low price, and is widely used in many disciplines such as image processing, pattern recognition, and computer vision. In the optical screen fingerprint recognition technology (i.e., the under-screen fingerprint recognition technology), a recognition module is placed under the panel of the screen of the mobile phone, during recognition, the RGB light emitted penetrates the panel to form an optical fingerprint film on the fingertip, thereafter the collected fingerprint information is fed back to the recognition module, and at last, the system performs comparison. For example, FIG. 1 illustrates a schematic diagram of collecting a fingerprint 104 by an electronic device 101. The electronic device is denoted by 101, the display screen is denoted by 102, the preset region for fingerprint collection is denoted by 103, and the fingerprint is denoted by 104 as an example. When the display screen is touched by a finger, the light emitted from the display screen penetrates the panel to illuminate the fingerprint texture, the reflected light from the fingerprint penetrates the display screen and returns to the sensor, and finally a fingerprint image is formed for recognition.

Figure 2:
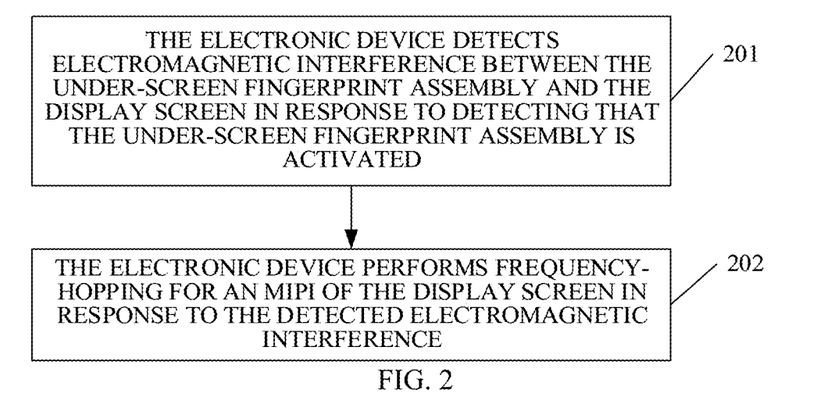
FIG. 2 is a schematic flow chart illustrating a method for electromagnetic interference control according to implementations.

FIG. 2 is a schematic flow chart illustrating a method for electromagnetic interference control according to implementations. The method is implemented in an electronic device. The electronic device includes a display screen and an under-screen fingerprint assembly arranged under a preset region of the display screen. As illustrated in FIG. 2, the method begins at block 201.

At block 201, the electronic device detects electromagnetic interference between the under-screen fingerprint assembly and the display screen in response to detecting that the under-screen fingerprint assembly is activated, where the preset region of the display screen is in a lighted state.

Since the under-screen fingerprint assembly collects fingerprint images based on optical principles, when the electronic device activates the under-screen fingerprint assembly, the electronic device will simultaneously light up the preset region near the under-screen fingerprint assembly. Since the display screen is operating, an MIPI of the display screen will operate in an operating frequency (i.e., an MIPI frequency). In this case, if the MIPI frequency and a sampling frequency of the under-screen fingerprint assembly affect each other, electromagnetic interference may occur.

In at least one implementation, the preset region is a display region adjacent to the under-screen fingerprint assembly. That is, the orthographic projection of the under-screen fingerprint assembly on the display screen is within the preset region. The position and size of the under-screen fingerprint assembly is not limited herein.

At block 202, the electronic device performs frequency-hopping for an MIPI of the display screen in response to the detected electromagnetic interference.

The display screen can support different MIPI frequencies or frequency bands, such as 514.5 MHz, 512.5 MHz, according to capabilities of chips.

According to the implementations, the electronic device includes the display screen and the under-screen fingerprint assembly arranged under the preset region of the display screen. In response to detecting that the under-screen fingerprint assembly is activated, detect electromagnetic interference between the under-screen fingerprint assembly and the display screen, where the preset region of the display screen is in the lighted state. In response to the detected electromagnetic interference, frequency-hopping is performed for the MIPI of the display screen. As the electronic device performs frequency-hopping for the MIPI frequency of the display screen, the MIPI frequency of the display screen can be adjusted to a frequency that no longer interferes with the under-screen fingerprint assembly, thereby improving the accuracy and stability of the under-screen fingerprint unlocking of the electronic device.

In at least one implementation, the electronic device performs frequency-hopping for the MIPI of the display screen as follows. The electronic device determines a target frequency of an MIPI frequency of the display screen. The electronic device adjusts the MIPI frequency of the display screen to the target frequency.

The target frequency is a frequency that will not cause electromagnetic interference with the sampling frequency of the under-screen fingerprint assembly, for example, the target frequency can be the target frequency itself, a frequency multiplication of the target frequency, or a frequency division of the target frequency, where the difference between the frequency multiplication of the target frequency or the frequency division of the target frequency and the sampling frequency of the under-screen fingerprint assembly is greater than a preset difference.

According to the implementation, when performing frequency-hopping, the electronic device determines the target frequency of the MIPI frequency of the display screen, and then adjusts the MIPI frequency of the display screen to the target frequency. That is, by adjusting the MIPI frequency of the display screen, it is possible to avoid influence on accuracy and stability of fingerprint image collection of the under-screen fingerprint assembly due to electromagnetic interference and to improve accuracy and stability of fingerprint image collection of the electronic device.

In at least one implementation, the electronic device determines the target frequency of the MIPI frequency of the display screen as follows. The electronic device obtains an available frequency range or an available frequency of the MIPI frequency of the display screen. The electronic device determines the target frequency of the MIPI frequency of the display screen according to a first sampling frequency of the under-screen fingerprint assembly, and any one of the available frequency range and the available frequency.

The available frequency range of the MIPI frequency of the display screen can include one or more frequency ranges. Similarly, the available frequency of the MIPI frequency of the display screen can include one or more frequencies. Since the first sampling frequency of the under-screen fingerprint assembly is generally preset to a fixed value, the MIPI frequency needs to be adjusted to a frequency that will not cause electromagnetic interference with the first sampling frequency.

According to the implementation, the electronic device can dynamically adjust the MIPI frequency of the display screen, so that while keeping the first sampling frequency of the under-screen fingerprint assembly unchanged, electromagnetic interference can be reduced or eliminated, and accuracy and stability of fingerprint image collection can be ensured.

In at least one implementation, the electronic device obtains the available frequency range or the available frequency of the MIPI frequency of the display screen as follows. The electronic device determines a display state of the display screen, where the display state includes a screen-off display state and a screen-on display state, only the preset region of the display screen is lighted up in the screen-off display state, and the whole screen of the display screen is lighted up in the screen-on display state. The electronic device determines the available frequency range or the available frequency of the MIPI frequency corresponding to the display state of the display screen by querying a mapping relationship set, where the mapping relationship set includes correspondences between display states and any one of available frequency ranges and available frequencies of the MIPI frequency.

When the electronic device is in the screen-off display state, since only the preset region is lighted up, display of image contents is generally not involved, that is, its function is only to provide a light source for the under-screen fingerprint assembly. In this case, the electronic device has relatively low requirements on the frame rate, resolution, etc. of the display screen, so frequencies in a corresponding first adjustable MIPI frequency range may be relatively low. When the electronic device is in the screen-on display state, the display screen can display a lock-screen interface, such as a lock-screen wallpaper, etc., and the user may want to view contents on the interface. In this case, the electronic device has relatively high requirements on the frame rate, resolution, etc. of the display screen, so frequencies in a corresponding second adjustable MIPI frequency range may be relatively high. That is, for the two states, different frequency ranges are preset to more accurately adapt to a current display state of the display screen.

According to the implementation, the electronic device can preset different adjustable MIPI frequency ranges for different display states of the display screen. Therefore, the target frequency that is more suitable for the current display state can be determined according to the frequency range, so that system performance can be balanced while reducing or avoiding electromagnetic interference. For example, in the screen-off display state, energy consumption can be reduced, and in the screen-on display state, display effect and user experience can be ensured.

In at least one implementation, the electronic device adjusts the MIPI frequency of the display screen to the target frequency as follows. The electronic device obtains a target value of a screen parameter associated with the target frequency, where the target value is associated with a reference value, the reference value is determined by the electronic device under a first constraint condition according to a frame rate calculation equation and the target frequency, the first constraint condition is that a change amount of a frame rate of the display screen after MIPI frequency switching is less than a first threshold, and the screen parameter includes at least one of the following porch values in the frame rate calculation equation: horizontal back porch (HBP), horizontal front porch (HFP), vertical back porch (VBP), vertical front porch (VFP), vertical sync active (VSA), or horizontal sync active (HSA). The electronic device adjusts a value of the screen parameter to the target value and adjusts the MIPI frequency of the display screen to the target frequency.

The frame rate calculation equation is as follows.

$$FPS=CLK\_rate \times 2 \times lane\_num/((height+VBP+VSA+VFP)\times(weight+HBP+HFP+HSA)\times bits\_per\-pixel).$$

The FPS represents the frame rate of the display screen; CLK_rate represents the MIPI frequency; lane_num represents the number of channels; height and weight represent the physical size of the display screen; VBP represents the number of invalid lines after a vertical sync signal at the beginning of one frame of image; VFP represents the number of invalid lines before the vertical sync signal after the end of one frame of image; VSA represents the width of the vertical sync signal; HBP represents the number of clocks from the start of a horizontal sync signal to the start of one line of valid data; HFP represents the number of clocks from the end of one line of valid data to the start of the next horizontal sync signal; HSA represents the width of the horizontal sync signal; bits_perpixel represents the width of displayed RGB data.

The first threshold may be a value obtained through experience, which can ensure stability of contents displayed on the display screen before and after frequency switching. For example, the first threshold may be the maximum allowable error range of the chip of the display screen, i.e., 1%.

According to the implementation, after frequency-hopping of the electronic device, a parameter(s) of the display screen of the electronic device will be changed. The frame rate is a parameter for indicating display stability of the display screen after frequency-hopping. Therefore, based on the frame rate calculation equation, the electronic device can predetermine target values of the screen parameters that need to be synchronously adjusted during frequency-hopping, thereby improving the display stability of the display screen.

In at least one implementation, the screen parameter includes a horizontal screen parameter, where the horizontal screen parameter includes at least one of the HBP, the HFP, or the HSA.

The target value is determined by adjusting the reference value under a second constraint condition by the electronic device, where the second constraint condition is that a change amount of a line scan duration of the display screen after the MIPI frequency switching is less than a second threshold.

For example, when the primary frequency of the MIPI of the display screen is 514.5 MHz, the measured line scan duration is 7.18 us. When the MIPI frequency is switched to the auxiliary frequency of 529 MHz, fine-tuning is performed according to the reference value of the screen parameter, the line scan duration is also measured, and the value of the fine-tuned screen parameter when the line scan duration is 7.18 us is determined as the target value. This is mainly because the frame rate calculation equation is only a theoretical calculation equation. In fact, due to physical differences between devices, accuracy of this reference value is not very high. On the other hand, actually, the MIPI frequency is different from the values of the screen parameters (difference by MHz and tens or hundreds), and the horizontal screen parameter of the display screen has a greater impact on the display stability. Therefore, the value of the horizontal screen parameter is calibrated based on the actual detection result to improve the stability.

Furthermore, if the screen parameter includes a vertical screen parameter, where the vertical screen parameter includes at least one of the VBP, the VFP, or the VAS, the target value is equal to the reference value, that is, adjusting the porch value in the vertical direction has no influence on the line scan duration.

According to the implementation, when the screen parameter includes the horizontal screen parameter, the electronic device can calibrate the reference value according to the constraint condition of line scan time and the actual detection result, thereby improving the stability of the display screen after frequency-hopping.

In at least one implementation, the electronic device detects electromagnetic interference between the under-screen fingerprint assembly and the display screen as follows. The electronic device detects a first sampling frequency of the under-screen fingerprint assembly and a first frequency of the MIPI of the display screen. The electronic device detects the electromagnetic interference between the under-screen fingerprint assembly and the display screen according to the first sampling frequency and the first frequency.

The first sampling frequency of the under-screen fingerprint assembly can be read directly, and the first frequency of MIPI can be read by the control chip of the display screen.

According to the implementation, the electronic device can obtain the sampling frequency of the under-screen fingerprint assembly and the MIPI frequency of the display screen respectively, and compare these two frequencies to determine whether electromagnetic interference occurs. Since the sampling frequency and the MIPI frequency can be obtained in real time, recognition efficiency can be improved.

In at least one implementation, the electronic device detects the electromagnetic interference between the under-screen fingerprint assembly and the display screen according to the first sampling frequency and the first frequency as follows. The electronic device determines a first frequency set according to the first frequency, where the first frequency set includes the first frequency and at least one of at least one frequency division of the first frequency and at least one frequency multiplication of the first frequency. The electronic device detects the electromagnetic interference between the under-screen fingerprint assembly and the display screen by comparing the first sampling frequency with frequencies in the first frequency set.

According to the implementation, the frequency multiplication or frequency division of the MIPI frequency of the display screen will also interfere with devices working at adjacent frequencies and cause electromagnetic interference. As such, by comparing the first sampling frequency and the frequencies in the first frequency set, electromagnetic interference can be detected comprehensively and accurately, improving accuracy and comprehensiveness of detection.

Figure 3:
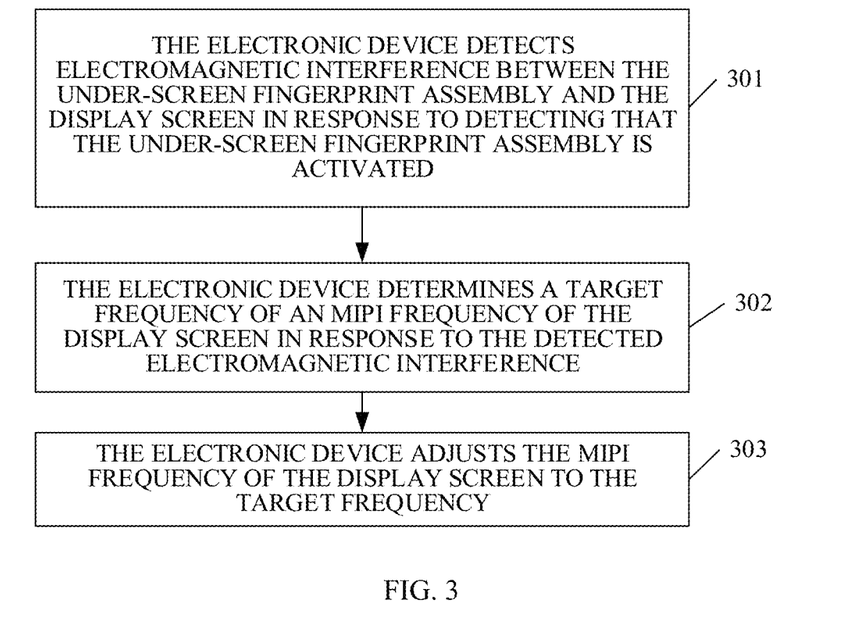
FIG. 3 is a schematic flow chart illustrating a method for electromagnetic interference control according to other implementations.

In accordance with the implementations of FIG. 2, FIG. 3 is a schematic flow chart illustrating a method for electromagnetic interference control according to other implementations. The method is for the electronic device of FIG. 1. The electronic device includes a display screen and an under-screen fingerprint assembly arranged under a preset region of the display screen. As illustrated in FIG. 3, the method begins at block 301.

At block 301, the electronic device detects electromagnetic interference between the under-screen fingerprint assembly and the display screen in response to detecting that the under-screen fingerprint assembly is activated, where the preset region of the display screen is in a lighted state.

At block 302, the electronic device determines a target frequency of an MIPI frequency of the display screen in response to the detected electromagnetic interference.

At block 303, the electronic device adjusts the MIPI frequency of the display screen to the target frequency.

According to the implementations, the electronic device includes the display screen and the under-screen fingerprint assembly arranged under the preset region of the display screen. In response to detecting that the under-screen fingerprint assembly is activated, detect electromagnetic interference between the under-screen fingerprint assembly and the display screen, where the preset region of the display screen is in the lighted state. In response to the detected electromagnetic interference, frequency-hopping is performed for the MIPI of the display screen. As the electronic device performs frequency-hopping for the MIPI frequency of the display screen, the MIPI frequency of the display screen can be adjusted to a frequency that no longer interferes with the under-screen fingerprint assembly, thereby improving the accuracy and stability of the under-screen fingerprint unlocking of the electronic device.

Furthermore, when performing frequency-hopping, the electronic device determines the target frequency of the MIPI frequency of the display screen, and then adjusts the MIPI frequency of the display screen to the target frequency. That is, by adjusting the MIPI frequency of the display screen, it is possible to avoid influence on accuracy and stability of fingerprint image collection of the under-screen fingerprint assembly due to electromagnetic interference and to improve accuracy and stability of fingerprint image collection of the electronic device.

Figure 4:
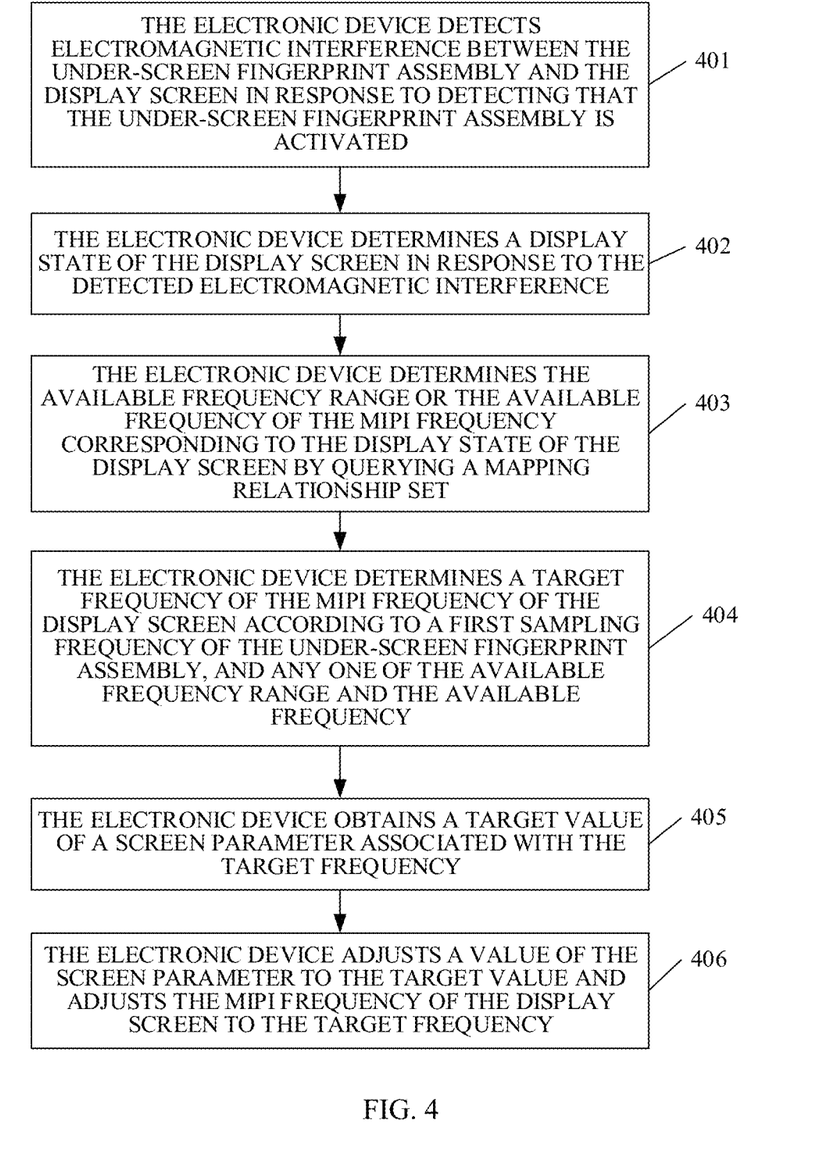
FIG. 4 is a schematic flow chart illustrating a method for electromagnetic interference control according to other implementations.

In accordance with the implementations of FIG. 2, FIG. 4 is a schematic flow chart illustrating a method for electromagnetic interference control according to other implementations. The method is for an electronic device. The electronic device includes a display screen and an under-screen fingerprint assembly arranged under a preset region of the display screen. As illustrated in FIG. 4, the method begins at block 401.

At block 401, the electronic device detects electromagnetic interference between the under-screen fingerprint assembly and the display screen in response to detecting that the under-screen fingerprint assembly is activated, where the preset region of the display screen is in a lighted state.

At block 402, the electronic device determines a display state of the display screen in response to the detected electromagnetic interference, where the display state includes a screen-off display state and a screen-on display state, only the preset region of the display screen is lighted up in the screen-off display state, and the whole screen of the display screen is lighted up in the screen-on display state.

At block 403, the electronic device determines the available frequency range or the available frequency of the MIPI frequency corresponding to the display state of the display screen by querying a mapping relationship set, where the mapping relationship set includes correspondences between display states and any one of available frequency ranges and available frequencies of the MIPI frequency.

At block 404, the electronic device determines a target frequency of the MIPI frequency of the display screen according to a first sampling frequency of the under-screen fingerprint assembly, and any one of the available frequency range and the available frequency.

At block 405, the electronic device obtains a target value of a screen parameter associated with the target frequency, where the target value is associated with a reference value, the reference value is determined by the electronic device under a first constraint condition according to a frame rate calculation equation and the target frequency, the first constraint condition is that a change amount of a frame rate of the display screen after MIPI frequency switching is less than a first threshold, and the screen parameter includes at least one of the following porch values in the frame rate calculation equation: HBP, HFP, VBP, VFP, VSA, or HSA.

At block 406, the electronic device adjusts a value of the screen parameter to the target value and adjusts the MIPI frequency of the display screen to the target frequency.

According to the implementations, the electronic device includes the display screen and the under-screen fingerprint assembly arranged under the preset region of the display screen. In response to detecting that the under-screen fingerprint assembly is activated, detect electromagnetic interference between the under-screen fingerprint assembly and the display screen, where the preset region of the display screen is in the lighted state. In response to the detected electromagnetic interference, frequency-hopping is performed for the MIPI of the display screen. As the electronic device performs frequency-hopping for the MIPI frequency of the display screen, the MIPI frequency of the display screen can be adjusted to a frequency that no longer interferes with the under-screen fingerprint assembly, thereby improving the accuracy and stability of the under-screen fingerprint unlocking of the electronic device.

Furthermore, the electronic device can preset different adjustable MIPI frequency ranges for different display states of the display screen. Therefore, the target frequency that is more suitable for the current display state can be determined according to the frequency range, so that system performance can be balanced while reducing or avoiding electromagnetic interference. For example, in the screen-off display state, energy consumption can be reduced, and in the screen-on display state, display effect and user experience can be ensured.

Figure 5:
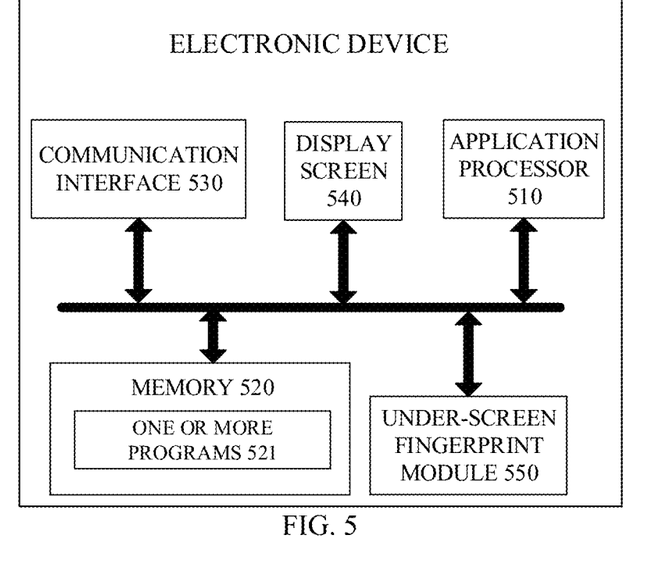
FIG. 5 is a schematic structural diagram illustrating an electronic device according to implementations.

In accordance with the implementations of FIG. 2, FIG. 3, and FIG. 4, FIG. 5 is a schematic structural diagram illustrating an electronic device 500 according to implementations. As illustrated in FIG. 5, the electronic device 500 includes a processor such as an application processor 510, a memory 520, a display screen 540, an under-screen fingerprint assembly 550, and a communication interface 530. The memory 520 is configured to store a computer program such as one or more programs 521. The one or more programs 521 are configured to be executed by the application processor 510 and include instructions configured to perform the following operations.

Electromagnetic interference between the under-screen fingerprint assembly and the display screen is detected in response to detecting that the under-screen fingerprint assembly is activated, where the preset region of the display screen is in a lighted state.

Frequency-hopping is performed for an MIPI of the display screen in response to the detected electromagnetic interference.

According to the implementations, the electronic device includes the display screen and the under-screen fingerprint assembly arranged under the preset region of the display screen. In response to detecting that the under-screen fingerprint assembly is activated, detect electromagnetic interference between the under-screen fingerprint assembly and the display screen, where the preset region of the display screen is in the lighted state. In response to the detected electromagnetic interference, frequency-hopping is performed for the MIPI of the display screen. As the electronic device performs frequency-hopping for the MIPI frequency of the display screen, the MIPI frequency of the display screen can be adjusted to a frequency that no longer interferes with the under-screen fingerprint assembly, thereby improving the accuracy and stability of the under-screen fingerprint unlocking of the electronic device.

In at least one implementation, in terms of performing frequency-hopping for the MIPI of the display screen, the instructions of the one or more programs are configured to perform the following operations. A target frequency of an MIPI frequency of the display screen is determined. The MIPI frequency of the display screen is adjusted to the target frequency.

In at least one implementation, in terms of determining the target frequency of the MIPI frequency of the display screen, the instructions of the one or more programs are configured to perform the following operations. An available frequency range or an available frequency of the MIPI frequency of the display screen is obtained. The target frequency of the MIPI frequency of the display screen is determined according to a first sampling frequency of the under-screen fingerprint assembly, and any one of the available frequency range and the available frequency.

In at least one implementation, in terms of obtaining the available frequency range or the available frequency of the MIPI frequency of the display screen, the instructions of the one or more programs are configured to perform the following operations. A display state of the display screen is determined, where the display state includes a screen-off display state and a screen-on display state, only the preset region of the display screen is lighted up in the screen-off display state, and the whole screen of the display screen is lighted up in the screen-on display state. The available frequency range or the available frequency of the MIPI frequency corresponding to the display state of the display screen is determined by querying a mapping relationship set, where the mapping relationship set includes correspondences between display states and any one of available frequency ranges and available frequencies of the MIPI frequency.

In at least one implementation, in terms of adjusting the MIPI frequency of the display screen to the target frequency, the instructions of the one or more programs are configured to perform the following operations. A target value of a screen parameter associated with the target frequency is obtained, where the target value is associated with a reference value, the reference value is determined by the electronic device under a first constraint condition according to a frame rate calculation equation and the target frequency, the first constraint condition is that a change amount of a frame rate of the display screen after MIPI frequency switching is less than a first threshold, and the screen parameter includes at least one of the following porch values in the frame rate calculation equation: HBP, HFP, VBP, VFP, VSA, or HSA. A value of the screen parameter is adjusted to the target value and the MIPI frequency of the display screen is adjusted to the target frequency.

In at least one implementation, the screen parameter includes a horizontal screen parameter, where the horizontal screen parameter includes at least one of the HBP, the HFP, or the HSA.

The target value is determined by adjusting the reference value under a second constraint condition by the electronic device, where the second constraint condition is that a change amount of a line scan duration of the display screen after the MIPI frequency switching is less than a second threshold.

In at least one implementation, in terms of detecting electromagnetic interference between the under-screen fingerprint assembly and the display screen, the instructions of the one or more programs are configured to perform the following operations. A first sampling frequency of the under-screen fingerprint assembly and a first frequency of the MIPI of the display screen are detected. Electromagnetic interference between the under-screen fingerprint assembly and the display screen is detected according to the first sampling frequency and the first frequency.

In at least one implementation, in terms of detecting the electromagnetic interference between the under-screen fingerprint assembly and the display screen according to the first sampling frequency and the first frequency, the instructions of the one or more programs are configured to perform the following operations. A first frequency set is determined according to the first frequency, where the first frequency set includes the first frequency and at least one of at least one frequency division of the first frequency and at least one frequency multiplication of the first frequency. The electromagnetic interference between the under-screen fingerprint assembly and the display screen is detected by comparing the first sampling frequency with frequencies in the first frequency set.

The foregoing solution of the implementations of the disclosure is mainly described from the viewpoint of execution process of the method. It can be understood that, in order to implement the above functions, the mobile terminal includes hardware structures and/or software modules corresponding to the respective functions. Those skilled in the art should readily recognize that, in combination with the example units and scheme steps described in the implementations disclosed herein, the present disclosure can be implemented in hardware or a combination of the hardware and computer software. Whether a function is implemented by way of the hardware or hardware driven by the computer software depends on the particular application and design constraints of the technical solution. Those skilled in the art may use different methods to implement the described functions for each particular application, but such implementation should not be considered as beyond the scope of the present disclosure.

According to the implementations of the disclosure, functional units may be divided for the mobile terminal in accordance with the foregoing method examples. For example, each functional unit may be divided according to each function, and two or more functions may be integrated in one processing unit. The above-mentioned integrated unit can be implemented in the form of hardware or software functional units. It should be noted that the division of units in the implementations of the present disclosure is schematic, and is merely a logical function division, and there may be other division manners in actual implementation.

Figure 6:
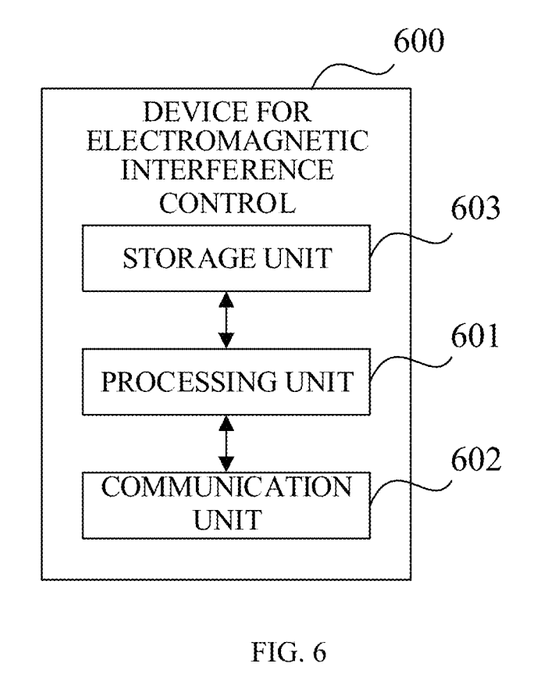
FIG. 6 is a block diagram illustrating functional units of a device for electromagnetic interference control according to implementations.

FIG. 6 is a block diagram illustrating functional units of a device 600 for electromagnetic interference control according to implementations. The device 600 for electromagnetic interference control is for an electronic device. The electronic device includes a display screen and an under-screen fingerprint assembly arranged under a preset region of the display screen. The device for electromagnetic interference control includes a communication unit 602 and a processing unit 601.

The processing unit 601 is configured to: detect, via the communication unit 602, whether there is electromagnetic interference between the under-screen fingerprint assembly and the display screen in response to detecting that the under-screen fingerprint assembly is activated, where the preset region of the display screen is in a lighted state, and perform frequency-hopping for an MIPI of the display screen when there is electromagnetic interference between the under-screen fingerprint module and the display screen.

The device 600 for electromagnetic interference control may also include a storage unit 603 for storing program codes and data of the electronic device. The processing unit 601 may be a processor, the communication unit 602 may be a touch screen or a transceiver, and the storage unit 603 may be a memory.

According to the implementations, the electronic device includes the display screen and the under-screen fingerprint assembly arranged under the preset region of the display screen. In response to detecting that the under-screen fingerprint assembly is activated, detect electromagnetic interference between the under-screen fingerprint assembly and the display screen, where the preset region of the display screen is in the lighted state. In response to the detected electromagnetic interference, frequency-hopping is performed for the MIPI of the display screen. As the electronic device performs frequency-hopping for the MIPI frequency of the display screen, the MIPI frequency of the display screen can be adjusted to a frequency that no longer interferes with the under-screen fingerprint assembly, thereby improving the accuracy and stability of the under-screen fingerprint unlocking of the electronic device.

In at least one implementation, the processing unit 601 configured to perform frequency-hopping for the MIPI of the display screen is configured to: determine a target frequency of an MIPI frequency of the display screen, and adjust the MIPI frequency of the display screen to the target frequency.

In at least one implementation, the processing unit 601 configured to determine the target frequency of the MIPI frequency of the display screen is configured to: obtain an available frequency range or an available frequency of the MIPI frequency of the display screen, and determine the target frequency of the MIPI frequency of the display screen according to a first sampling frequency of the under-screen fingerprint assembly, and any one of the available frequency range and the available frequency.

In at least one implementation, the processing unit 601 configured to obtain the available frequency range or the available frequency of the MIPI frequency of the display screen is configured to: determine a display state of the display screen, where the display state includes a screen-off display state and a screen-on display state, the screen-off display state refers to a state in which only the preset region of the display screen is lighted up, and the screen-on display state refers to a state in which the whole screen of the display screen is lighted up, and determine the available frequency range or the available frequency of the MIPI frequency corresponding to the display state of the display screen by querying a mapping relationship set, where the mapping relationship set includes correspondences between display states and any one of available frequency ranges and available frequencies of the MIPI frequency.

In at least one implementation, the processing unit 601 configured to adjust the MIPI frequency of the display screen to the target frequency is configured to: obtain a target value of a screen parameter associated with the target frequency, where the target value is associated with a reference value, the reference value is determined by the electronic device under a first constraint condition according to a frame rate calculation equation and the target frequency, the first constraint condition is that a change amount of a frame rate of the display screen after MIPI frequency switching is less than a first threshold, and the screen parameter includes at least one of the following porch values in the frame rate calculation equation: HBP, HFP, VBP, VFP, VSA, or HSA, and adjust a value of the screen parameter to the target value and adjust the MIPI frequency of the display screen to the target frequency.

In at least one implementation, the screen parameter includes a horizontal screen parameter, where the horizontal screen parameter includes at least one of the HBP, the HFP, or the HSA. The target value is determined by adjusting the reference value under a second constraint condition by the electronic device, where the second constraint condition is that a change amount of a line scan duration of the display screen after the MIPI frequency switching is less than a second threshold.

In at least one implementation, the processing unit 601 configured to detect, via the communication unit 602, electromagnetic interference between the under-screen fingerprint assembly and the display screen is configured to: detect, via the communication unit 602, a first sampling frequency of the under-screen fingerprint assembly and a first frequency of the MIPI of the display screen, and detect the electromagnetic interference between the under-screen fingerprint assembly and the display screen according to the first sampling frequency and the first frequency.

In at least one implementation, the processing unit 601 configured to detect the electromagnetic interference between the under-screen fingerprint assembly and the display screen according to the first sampling frequency and the first frequency is configured to: determine a first frequency set according to the first frequency, where the first frequency set includes the first frequency and at least one of at least one frequency division of the first frequency and at least one frequency multiplication of the first frequency, and detect the electromagnetic interference between the under-screen fingerprint assembly and the display screen by comparing the first sampling frequency with frequencies in the first frequency set.

Implementations further provide non-transitory computer readable storage medium. The non-transitory computer readable storage medium is configured to store a computer program for electronic data interchange. The computer program causes a computer to execute all or part of operations of the method of the above. The computer includes an electronic device.

Implementations further provide a computer program product. The computer program product includes a non-transitory computer-readable storage medium storing a computer program. The computer program is operable to cause the computer execute all or part of operations of the method of the above. The computer program product may be a software installation package. The computer includes an electronic device.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection, mechanical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer readable storage when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory includes various medium capable of storing program codes, such as a USB (universal serial bus) flash disk, a read-only memory (ROM), a random-access memory (RAM), a removable hard disk, Disk, compact disc (CD), or the like.

It will be understood by those of ordinary skill in the art that all or a part of the various methods of the implementations described above may be accomplished by means of a program to instruct associated hardware, the program may be stored in a computer readable storage, which may include a flash memory, a ROM, a RAM, disk or CD, and so on.

The implementations of this application are described in detail above. Some examples are used herein to illustrate the principle and implementation manners of this application. The description of the above implementations is only used to help understand the method and core idea of this application. Meanwhile, for those of ordinary skill in the art, according to the idea of this application, there will be changes in the implementation manner and the application scope. In summary, contents of this specification should not be construed as a limitation on this application.

What is claimed is:

1. A method for electromagnetic interference control, for an electronic device comprising a display screen and an under-screen fingerprint assembly arranged under a preset region of the display screen, the method comprising:

detecting electromagnetic interference between the under-screen fingerprint assembly and the display screen in response to detecting that the under-screen fingerprint assembly is activated, wherein the preset region of the display screen is in a lighted state; and performing frequency-hopping for a mobile industry processor interface (MIPI) of the display screen in response to the detected electromagnetic interference.

2. The method of claim 1, wherein performing frequency-hopping for the MIPI of the display screen comprises:

determining a target frequency of an MIPI frequency of the display screen; and adjusting the MIPI frequency of the display screen to the target frequency.

3. The method of claim 2, wherein determining the target frequency of the MIPI frequency of the display screen comprises:

obtaining an available frequency range or an available frequency of the MIPI frequency of the display screen; and determining the target frequency of the MIPI frequency of the display screen according to a first sampling frequency of the under-screen fingerprint assembly, and any one of the available frequency range and the available frequency.

4. The method of claim 3, wherein obtaining the available frequency range or the available frequency of the MIPI frequency of the display screen comprises:

determining a display state of the display screen, wherein the display state comprises a screen-off display state and a screen-on display state, wherein only the preset region of the display screen is lighted up in the screen-off display state, and a whole screen of the display screen is lighted up in the screen-on display state; and determining the available frequency range or the available frequency of the MIPI frequency corresponding to the display state of the display screen by querying a mapping relationship set, wherein the mapping relationship set comprises correspondences between display states and any one of available frequency ranges and available frequencies of the MIPI frequency.

5. The method of claim 2, wherein adjusting the MIPI frequency of the display screen to the target frequency comprises:

obtaining a target value of a screen parameter associated with the target frequency, wherein the target value is associated with a reference value, the reference value is determined by the electronic device under a first constraint condition according to a frame rate calculation equation and the target frequency, the first constraint condition is that a change amount of a frame rate of the display screen after MIPI frequency switching is less than a first threshold, and the screen parameter comprises at least one of the following porch values in the frame rate calculation equation: horizontal back porch (HBP), horizontal front porch (HFP), vertical back porch (VBP), vertical front porch (VFP), vertical sync active (VSA), or horizontal sync active (HSA); and adjusting a value of the screen parameter to the target value of the screen parameter and adjusting the MIPI frequency of the display screen to the target frequency.

6. The method of claim 5, wherein the screen parameter comprises a horizontal screen parameter, wherein the horizontal screen parameter comprises at least one of the HBP, the HFP, or the HSA; and the target value is determined by adjusting the reference value under a second constraint condition by the electronic device, wherein the second constraint condition is that a change amount of a line scan duration of the display screen after the MIPI frequency switching is less than a second threshold.

7. The method of claim 1, wherein detecting electromagnetic interference between the under-screen fingerprint assembly and the display screen comprises:

detecting a first sampling frequency of the under-screen fingerprint assembly and a first frequency of the MIPI of the display screen; and detecting the electromagnetic interference between the under-screen fingerprint assembly and the display screen according to the first sampling frequency and the first frequency.

8. The method of claim 7, wherein detecting the electromagnetic interference between the under-screen fingerprint assembly and the display screen according to the first sampling frequency and the first frequency comprises:

determining a first frequency set according to the first frequency, wherein the first frequency set comprises the first frequency and at least one of at least one frequency division of the first frequency and at least one frequency multiplication of the first frequency; and detecting the electromagnetic interference between the under-screen fingerprint assembly and the display screen by comparing the first sampling frequency with frequencies in the first frequency set.

9. The method of claim 1, wherein the preset region is a display region adjacent to the under-screen fingerprint assembly.

10. An electronic device comprising:

a display screen;

an under-screen fingerprint assembly arranged under a preset region of the display screen;

at least one processor; and a memory, coupled to the at least one processor and storing at least one computer executable instruction thereon which, when executed by the at least one processor, causes the at least one processor to:

detect electromagnetic interference between the under-screen fingerprint assembly and the display screen in response to detecting that the under-screen fingerprint assembly is activated, wherein the preset region of the display screen is in a lighted state, and perform frequency-hopping for a mobile industry processor interface (MIPI) of the display screen in response to the detected electromagnetic interference.

11. The electronic device of claim 10, wherein the at least one processor configured to perform frequency-hopping for the MIPI of the display screen is configured to: determine a target frequency of an MIPI frequency of the display screen, and adjust the MIPI frequency of the display screen to the target frequency.

12. The electronic device of claim 11, wherein the at least one processor configured to determine the target frequency of the MIPI frequency of the display screen is configured to: obtain an available frequency range or an available frequency of the MIPI frequency of the display screen, and determine the target frequency of the MIPI frequency of the display screen according to a first sampling frequency of the under-screen fingerprint assembly, and any one of the available frequency range and the available frequency.

13. The electronic device of claim 12, wherein the at least one processor configured to obtain the available frequency range or the available frequency of the MIPI frequency of the display screen is configured to: determine a display state of the display screen, wherein the display state comprises a screen-off display state and a screen-on display state, wherein only the preset region of the display screen is lighted up in the screen-off display state, and a whole screen of the display screen is lighted up in the screen-on display state, and determine the available frequency range or the available frequency of the MIPI frequency corresponding to the display state of the display screen by querying a mapping relationship set, wherein the mapping relationship set comprises correspondences between display states and any one of available frequency ranges and available frequencies of the MIPI frequency.

14. The electronic device of claim 11, wherein the at least one processor configured to adjust the MIPI frequency of the display screen to the target frequency is configured to: obtain a target value of a screen parameter associated with the target frequency, wherein the target value is associated with a reference value, the reference value is determined by the electronic device under a first constraint condition according to a frame rate calculation equation and the target frequency, the first constraint condition is that a change amount of a frame rate of the display screen after MIPI frequency switching is less than a first threshold, and the screen parameter comprises at least one of the following porch values in the frame rate calculation equation: horizontal back porch (HBP), horizontal front porch (HFP), vertical back porch (VBP), vertical front porch (VFP), vertical sync active (VSA), or horizontal sync active (HSA), and adjust a value of the screen parameter to the target value of the screen parameter and adjusting the MIPI frequency of the display screen to the target frequency.

15. The electronic device of claim 14, wherein
the screen parameter comprises a horizontal screen parameter, wherein the horizontal screen parameter comprises at least one of the HBP, the HFP, or the HSA; and
the target value is determined by adjusting the reference value under a second constraint condition by the electronic device, wherein the second constraint condition is that a change amount of a line scan duration of the display screen after the MIPI frequency switching is less than a second threshold.

16. The electronic device of claim 10, wherein the at least one processor configured to detect electromagnetic interference between the under-screen fingerprint assembly and the display screen is configured to: detect a first sampling frequency of the under-screen fingerprint assembly and a first frequency of the MIPI of the display screen, and detect the electromagnetic interference between the under-screen fingerprint assembly and the display screen according to the first sampling frequency and the first frequency.

17. The electronic device of claim 16, wherein the at least one processor configured to detect the electromagnetic interference between the under-screen fingerprint assembly and the display screen according to the first sampling frequency and the first frequency is configured to: determine a first frequency set according to the first frequency, wherein the first frequency set comprises the first frequency and at least one of at least one frequency division of the first frequency and at least one frequency multiplication of the first frequency, and detect the electromagnetic interference between the under-screen fingerprint assembly and the display screen by comparing the first sampling frequency with frequencies in the first frequency set.

18. The electronic device of claim 10, wherein the preset region is a display region adjacent to the under-screen fingerprint assembly.

19. A non-transitory computer readable storage medium storing a computer program which, when executed by a processor, causes the processor to:
detect electromagnetic interference between a under-screen fingerprint assembly of an electronic device and a display screen of the electronic device in response to detecting that the under-screen fingerprint assembly is activated, and perform frequency-hopping for a mobile industry processor interface (MIPI) of the display screen in response to the detected electromagnetic interference, wherein the under-screen fingerprint assembly is arranged under a preset region of the display screen;
wherein the preset region of the display screen is in a lighted state.

20. The non-transitory computer readable storage medium of claim 19, wherein the computer program executed by the processor to perform frequency-hopping for the MIPI of the display screen is executed by the processor to:
determine a target frequency of an MIPI frequency of the display screen, and adjust the MIPI frequency of the display screen to the target frequency.

* * * * *